Oct. 10, 1961  J R. WRIGHT  3,003,355
LIQUID LEVEL MEASUREMENT IN SALT STORAGE CAVERNS
Filed Nov. 25, 1958   3 Sheets-Sheet 1
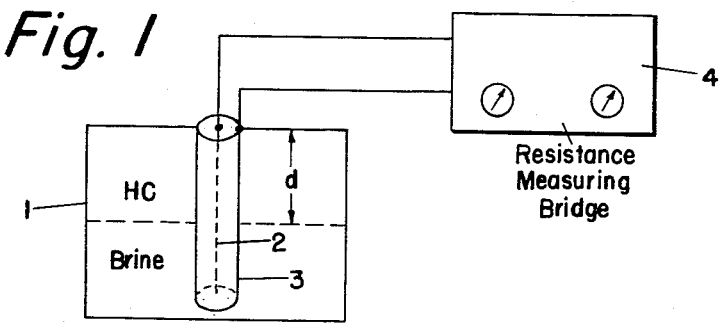
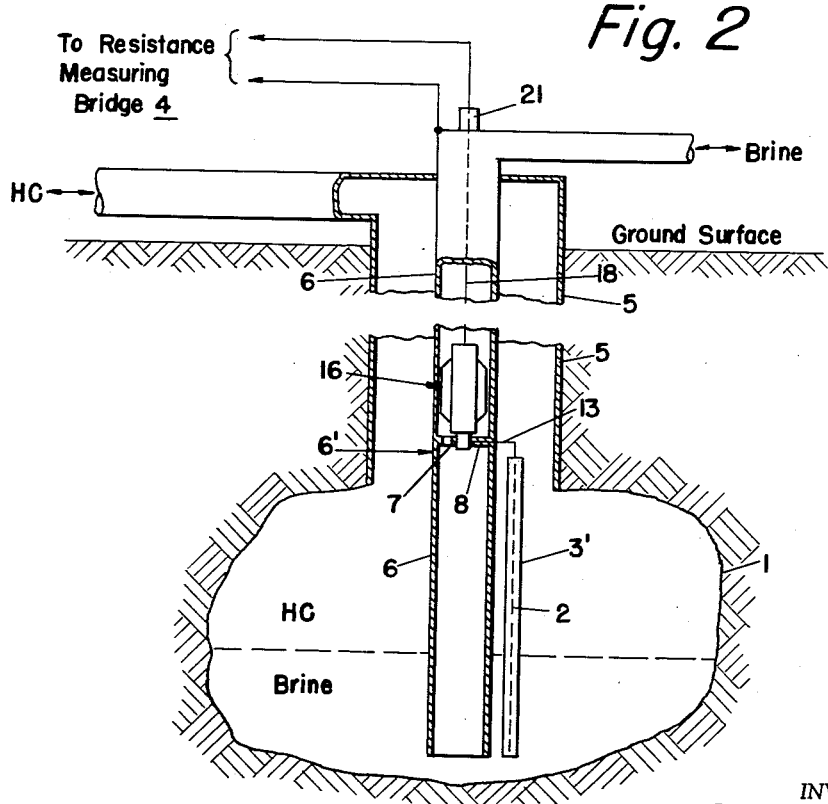
INVENTOR.
J RONDLE WRIGHT

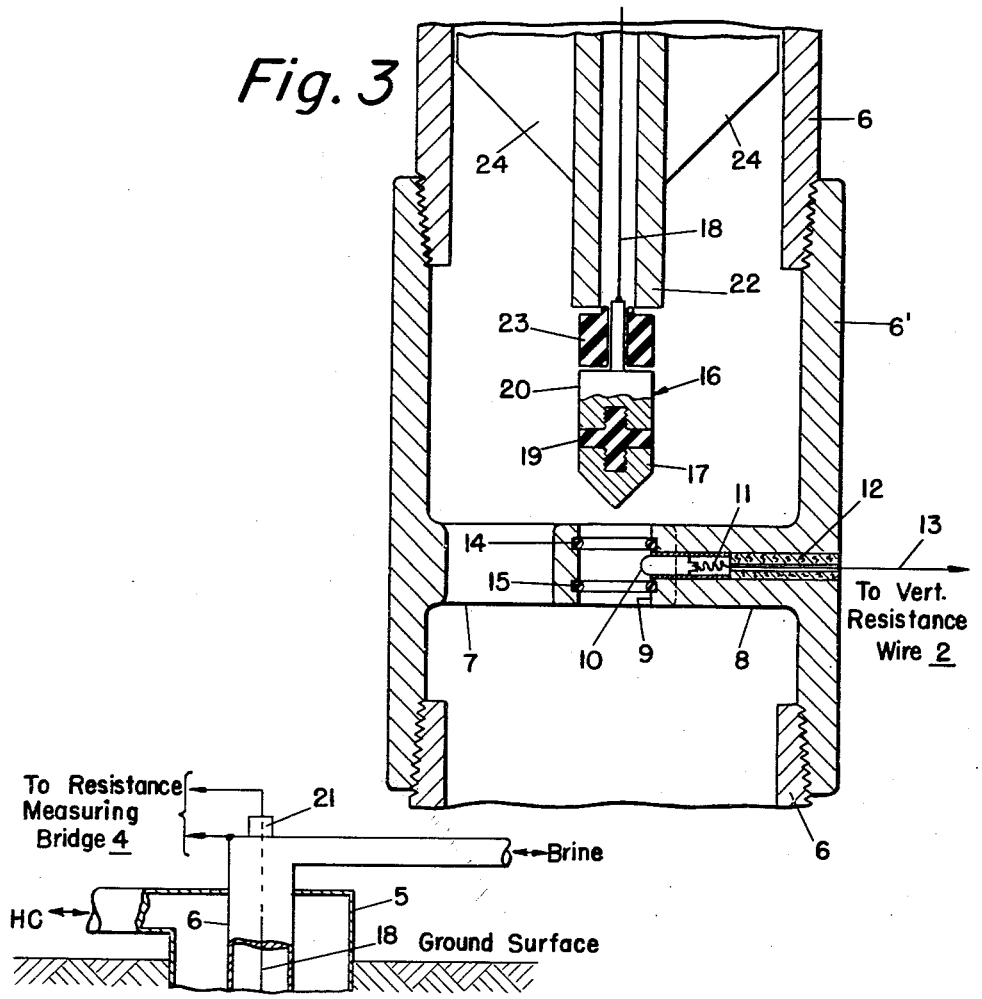
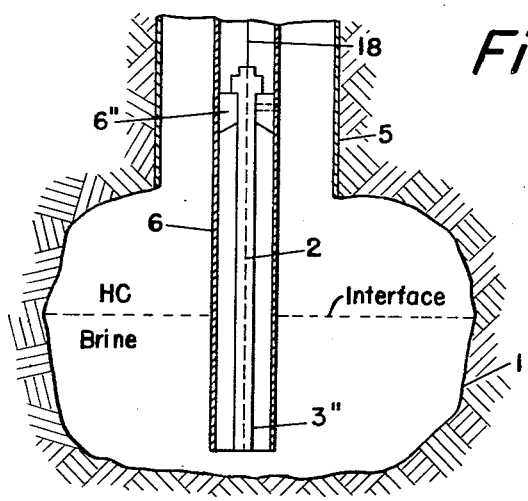

Oct. 10, 1961    J R. WRIGHT    3,003,355
LIQUID LEVEL MEASUREMENT IN SALT STORAGE CAVERNS
Filed Nov. 25, 1958    3 Sheets-Sheet 3
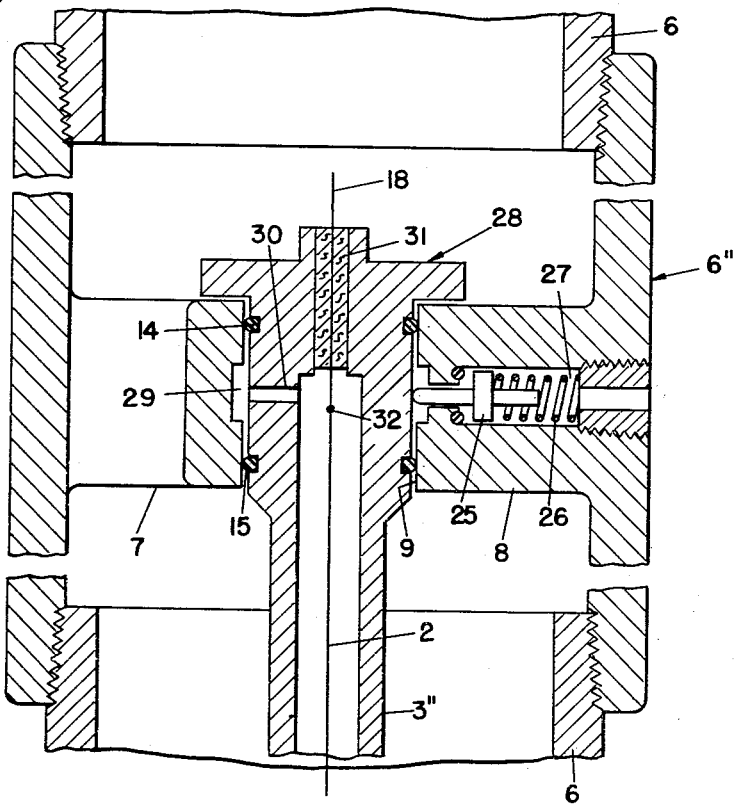
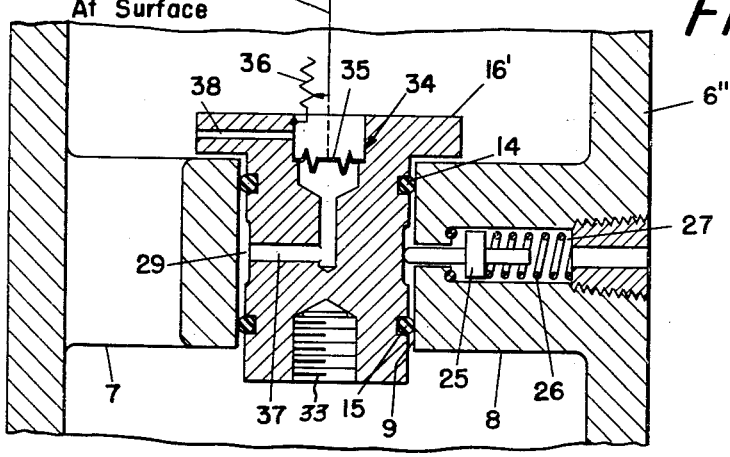
INVENTOR.
J RONDLE WRIGHT
BY
ATTORNEY

United States Patent Office 3,003,355
Patented Oct. 10, 1961

3,003,355
LIQUID LEVEL MEASUREMENT IN SALT STORAGE CAVERNS
J Rondle Wright, Newtown Square, Pa., assignor to Sun Oil Company, Philadelphia, Pa., a corporation of New Jersey
Filed Nov. 25, 1958, Ser. No. 776,223
12 Claims. (Cl. 73—299)

This invention relates to the measurement of liquid level, and more particularly to apparatus for the measurement of the interface level in a salt storage cavern.

The underground storage of petroleum and related products is becoming more popular, due mainly to the increased safety factor (as compared to above-ground storage) for the storage of highly volatile and inflammable liquids. Also, there is a large saving in initial cost, and also in maintenance, for an underground cavern, as compared to a surface storage vessel. Caverns washed out or leached out of salt domes or salt strata are particularly suited for the storage of liquefied petroleum gas (LPG). The caverns are usually located several hundred feed below the surface, and can therefore withstand the vapor pressure of the most volatile products.

Such caverns are ordinarily utilized for what is known as "wet storage," wherein the (less dense) product is stored in a layer above a layer of salt water (brine), and the cavern is kept filled at all time with liquid. In filling the cavern, the product is pumped in, and the displaced brine is either dumped or stored. When the product is removed, an equal volume of brine (or water) is put back into the cavern.

No prior commercial instrumentation is available for "gauging the cavern." Inventories have been customarily determined on an "in and out" basis. The only time a reliable inventory check could be made on a cavern was when all the product had been removed.

An object of this invention is to provide a novel apparatus for measuring the level of the interface between the bottom layer (brine) and the upper layer (product) in a salt storage cavern.

Another object is to provide a novel apparatus for measuring the pressure differential between the inside and outside of a brine pipe, in a salt storage cavern.

A further object is to provide a novel apparatus for measuring the interface level in a salt storage cavern, the apparatus being capable of use at any time, even while the cavern is being either filled or emptied. With the inventive apparatus, the cables and gear necessarily in the well and cavern will not interfere with normal pumping operations.

The objects of this invention are accomplished, briefly, in the following manner. A salt storage cavern which is completed and ready for storage has a relatively large diameter well casing (through which is pumped, during use of the cavern, the hydrocarbon or other liquid to be stored) extending from the surface down to the top of the cavern, and has inside this casing a smaller diameter brine pipe (through which is pumped, during use of the cavern, the brine) extending from the surface substantially to the bottom of the cavern. In a preferred embodiment, a special section of brine pipe is installed near the top of the cavern, this special section of pipe having therein a transverse aperture or channel connecting the interior of the brine pipe with the exterior thereof (i.e., with the space inside the well casing but outside the inner brine pipe). A spring-loaded valve is mounted in this channel in such a way as to normally close the same. An inner member, having mounted therein a differential pressure transducer, is lowered inside the inner pipe, this member being so constructed as to mate with the special section of pipe in such a way as to open the aforesaid valve and at the same time seal off a chamber from the inner pipe, into which chamber the transverse channel then opens. The transducer is arranged to measure the pressure differential between the interior of the inner pipe (exclusive of the sealed-off portion or chamber) and the exterior of the inner pipe (which is now in communication with the aforementioned chamber), this pressure differential being proportional to the depth of the interface level in the cavern, measured from the top of the cavern. The measured pressure differential is converted to an electrical resistance proportional in value to the amount of pressure differential. At the surface, the value of this resistance is measured and converted to a volume measurement by means of a form of calibration curve, previously obtained empirically.

In another embodiment, apparatus including a resistance wire in the cavern is used to develop an electrical resistance proportional to the location of the interface level in the cavern; the value of this resistance is measured at the surface and again converted to a volume measurement by means of an empirically-obtained calibration curve.

A detailed description of the invention follows, taken in conjunction with the accompanying drawings, wherein:

FIGURE 1 is a schematic representation showing the principles utilized in locating the interface level according to one embodiment of this invention;

FIGURES 2 and 3 illustrate one arrangement for installing a vertical (measuring) resistance wire in a salt storage cavern;

FIGURES 4 and 5 illustrate another arrangement for installing a vertical (measuring) resistance wire in a salt storage cavern; and FIGURE 6 is a detailed (partial) view of a modified, generally preferred, arrangement for measuring the liquid level (interface level) in a salt storage cavern.

According to one embodiment of the inventon, the interface detector consists essentially of two parallel electrical conductors which hang vertically in a salt storage cavern of the type previously described, employing "wet storage." At least one of the wires should have a resistance that is high compared with that of the connecting wires. First referring to FIGURE 1, a salt storage cavern 1 (shown in this figure as a rectangular prism, for convenience) is filled with a layer of hydrocarbon (HC) above a layer of brine. A resistance wire 2 is shown positioned inside a conducting tube 3 which is open at both ends, so that the interface level is the same inside this tube as it is outside. The tube 3 has a very low resistance compared with the resistance wire 2. The resistance wire 2 and the conducting tube 3 are connected to separate insulated leads which go to a resistance measuring bridge 4 (e.g., a Wheatstone bridge).

The brine is a conducting liquid, while the hydrocarbon is an insulating liquid. When the cavern is full of brine, the resistance wire 2 is shorted to the tube 3 at the top, and the measured resistance is $R_o$, the resistance of the lead wires. When the hydrocarbon-brine interface is located a distance $d$ below the top of the cavern (as in FIGURE 1), the measured resistance $R$ becomes:

$$R = R_o + dK \qquad (1)$$

where K is the resistance per unit length of the resistance wire 2. Then, since $R_o$ and K are known or have previously been determined, the value of the resistance R, measured by means of the bridge 4, uniquely determines the depth $d$ (below the top of the cavern) of the hydrocarbon-brine interface. The distance $d$ may then be easily solved for, by means of Equation 1.

Although the interface location distance $d$ may be determined by measuring the resistance R as above described, it is not necessary to actually compute this distance $d$. What we are often interested in ascertaining, when gauging the cavern, is the volume of hydrocarbon (product) therein. Once the resistance measurement has been made, the volume of product can be determined by utilizing or applying what is known as a "tank strapping curve." The "strapping curve" itself may be obtained by filling the empty cavern in steps of known amounts (or known volume), making a resistance measurement after each step. A curve relating volume of product to measured resistance may then be drawn up; by subsequent use of this "strapping curve," the volume of product in the cavern at any time may be determined from the resistance measurement made at this same time.

In practice, there are two possible arrangements for installing the vertical resistance wire shown in FIGURE 1, in a salt storage cavern. The first is an arrangement wherein the wire is strung on the outside of the brine pipe, before the latter is put down the well. The second is an arrangement wherein the resistance wire is placed inside a small pipe or tube and lowered inside the brine pipe, after the latter has been installed.

FIGURE 2 illustrates the first of the two general arrangements referred to. A salt storage cavern 1 has a relatively large well casing 5 extending from the surface down to the top of the cavern. The hydrocarbon to be stored in the cavern is pumped through casing 5, as indicated by the double arrow marked "HC." Inside the casing 5 is a smaller diameter brine pipe 6, extending from the surface substantially to the bottom of the cavern. The brine is pumped through pipe 6, as indicated by the double arrow labeled "Brine."

The resistance wire 2 is attached to the outside of the brine pipe 6, before the latter is put down the well. This wire must be securely attached to pipe 6 and well protected, so that it will not be damaged while lowering the brine pipe. The protection illustrated in FIGURE 2 is a small pipe 3′ (open at both ends, so that the interface inside the small pipe can follow the outside interface) surrounding wire 2 and attached to the outside of the brine pipe. For convenience in handling, each section of brine pipe is fitted with its own respective length of resistance wire and protecting pipe, an electrical jumper (not shown) being provided at each pipe joint, to make the resistance wire continuous. As will become apparent hereinafter, it is not necessary that the entire length of brine pipe 6 be fitted with resistance wire. It is necessary only that the resistance wire 2 extend from a point a few feet above the top of the cavern 1, to the bottom thereof. The resistance wire 2 is strung inside the small pipe 3′ using suitable insulation. The pipe 3′ is metallic and is electrically connected to brine pipe 6, so that electrical connections made to the latter at the surface will cause pipe 3′ to be connected into the electrical circuit, similarly to tube 3 in FIGURE 1.

At a point a few feet above the top of the cavern 1, a special section 6′ of brine pipe is installed, this section 6′ providing means for making an electrical connection to the resistance wire 2 after the brine pipe has been completely set. Referring to FIGURE 3, which illustrates in detail the special section 6′ of pipe which must be installed in the brine pipe 6 at the same time as the resistance wire, pipe section 6′ has a spider or spoke construction (two of the arms of which are illustrated at 7 and 8) about midway along its length which supports, centrally of the pipe section, a female pipe fitting 9. A spring loaded metallic contact 10 is positioned about midway of the length of fitting 9 and the inner end of this contact extends into the fitting slightly in a radial or transverse direction. Contact 10 is loaded (urged inwardly) by means of a spring 11, and this contact is mounted in the spider arm 8 by means of an insulated packing gland 12 which extends radially outwardly to the outer surface of pipe section 6′. Arm 8 has dimensions such as to entirely surround gland 12 and contact 10. Electrically attached to spring 11, and also to contact 10, is a wire 13 which is connected to the vertical resistance wire 2 shown in FIGURE 2. In this manner, contact 10 is electrically connected to resistance wire 2.

The space surrounding brine pipe 6 (i.e., the annular space between pipe 6 and well casing 5) is intended to be filled with hydrocarbon at all times, while the space inside pipe 6 is intended to be filled with brine at all times. Also, the brine pipe 6 is intended to be used as the low-potential or ground connection to the resistance measuring bridge 4 at the surface. The spider construction described offers only a small amount of impedance to the flow of brine through pipe 6.

An O-ring 14 is mounted in a suitable groove in fitting 9, above contact 10, and an O-ring 15 is similarly mounted in this fitting, below contact 10. The contact 10 is adapted to be engaged by a special "torpedo," indicated generally by the numeral 16, which has a male fitting 17 and which is lowered inside the brine pipe 6 on the end of an insulated cable 18. The torpedo 16, as it is lowered into the fitting 9, displaces the brine therefrom; when the torpedo is in its final position within this fitting, the O-rings 14 and 15 sealingly engage the torpedo to provide a sealed-off chamber (sealed off from brine pipe 6) between these O-rings, in which chamber is located the contact 10. On the torpedo 16, an insulating member 19 mechanically joins the fitting 17 to a metallic contact ring 20, but provides electrical insulation therebetween. When torpedo 16 is seated in fitting 9, the ring 20 is sealingly engaged by O-rings 14 and 15, but makes electrical contact with contact 10. The cable 18 is electrically connected to the upper end of contact ring 20, and is brought out at the well head through a suitable packing gland 21 (see FIGURE 2). Gland 21 prevents leakage of brine from pipe 6, around the cable 18.

Cable 18 serves as one connection to the resistance measuring bridge 4, and when the torpedo 16 is in place this cable is electrically connected (by way of contact ring 20, contact 10, spring 11, and wire 13) to resistance wire 2. The brine pipe 6 is utilized as the other connection to the resistance measuring bridge, pipe 6 being electrically connected to pipe 3′, as previously described. When torpedo 16 is seated in fitting 9, as shown in FIGURE 3, the packing gland 12 effectively prevents any leakage of hydrocarbon (from the outside of pipe 6) into the sealed-off chamber provided around contact 10. Also, the electrical insulating properties of this gland cause contact 10 to be insulated from the brine pipe. The O-ring seals 14 and 15 prevent any leakage of brine into the sealed-off chamber provided around contact 10. Such chamber is thus sealed off from both the brine pipe 6 and the hydrocarbon pipe 5.

If desired, the O-rings could be mounted on the torpedo 16, rather than on fitting 9; in fact, such a modified construction may even be preferable.

The torpedo 16 has centering fins 24 to ensure proper mating of fitting 17 with fitting 9. Also, the torpedo is weighted enough (the weight being provided in part by a cylindrical metallic member 22 which is longitudinally bored to allow passage of cable 18 therethrough and the lower end of which is electrically separated from contact ring 20 by means of an insulating washer 23) to ensure engagement of the contact ring 20 with contact 10.

The installation of the resistance wire 2, and the special pipe section 6′ with its contact 10, must be made at the time the brine pipe is put in place. The cable 18, with its torpedo 16 attached thereto, may be dropped down through the brine pipe 6, for installation, at any time after the brine pipe is completely set. The cable 18 and torpedo 16 are left in place until it is necessary to pull the brine pipe. Then the cable is simply pulled out, bringing the torpedo with it.

Once the torpedo 16 is in place, an electrical connection is made from the surface to the resistance wire 2, and measurements may then be made by means of a resistance measuring bridge, as previously described in connection with FIGURE 1. Thus, the cavern may be gauged, and the volume of hydrocarbon therein ascertained.

FIGURE 4 illustrates the second of the two general arrangements previously referred to (for installing the vertical resistance wire in the salt storage cavern). In this arrangement, the resistance wire 2 is strung in the bore of a small pipe or tube 3″, with insulating spacers (not shown) to keep the wire from touching the pipe; the said small pipe, containing the resistance wire, is lowered inside the brine pipe, after the latter has been installed, by means of the insulated cable 18. The pipe 3″ is open at the bottom and is much smaller than the brine pipe 6. In this case, a hydraulic connection is made by the torpedo, instead of an electrical connection as in FIGURES 2 and 3. The hydraulic connection is illustrated in detail in FIGURE 5.

At a point a few feet above the top of the cavern 1, a special section 6″ of brine pipe is installed, to enable the hydraulic connection to be made. This special pipe section is the only part of the apparatus which must be installed at the time the brine pipe is put in the cavern well. The top of the pipe 3″ is provided with a special male plug which forms a hydraulic seal in the special pipe section 6″.

Reference will now be made to FIGURE 5. The pipe section 6″ has a spider construction which supports a centrally-positioned female fitting 9. A spring loaded valve 25 (loaded by a spring 26 diagrammatically illustrated) is biased to normally close a transverse or radial channel or aperture 27 extending through the spider arm 8 and adapted to connect the interior of the brine pipe with the exterior thereof (i.e., with the hydrocarbon-filled space in the well casing 5). The interior end of valve 25 extends into the fitting 9 slightly, a distance sufficient to be engaged (thus opening the valve) by a male plug 28 provided at the upper end of pipe 3″. Arm 8 entirely surrounds valve 25, spring 26, and transverse or radial channel 27. The spider construction described offers only a small amount of impedance to the flow of brine through pipe 6.

The male plug 28 is adapted to mate with the female fitting 9, and this plug is rigidly secured to the upper end of pipe 3″. O-ring 14 is mounted in a suitable groove in plug 28, in a location such as to be above valve 25 when such plug is seated. An O-ring 15 is similarly mounted in plug 28, in a location such as to be below valve 25 when the plug is seated. When plug 28 is seated, the O-rings 14 and 15 sealingly engage the wall of fitting 9 to provide a sealed-off chamber 29 (sealed off from brine pipe 6) between these O-rings, in which chamber is located the valve 25. Plug 28, as it is lowered into fitting 9, displaces the brine from chamber 29. Plug 28 is provided, at a location between O-rings 14 and 15, with a radial or transverse aperture 30 which provides (when plug 28 is seated) hydraulic communication between chamber 29 and the upper end of the bore in pipe 3″.

The insulated cable 18 passes down through an insulated packing gland 31 provided in the upper end of plug 28, and is electrically connected at 32 to the upper end of resistance wire 2, which latter is positioned (as previously described) in the bore of pipe 3″. The gland 31 mechanically secures the assembly 2, 3″, 28 to cable 18, in addition to its insulating function.

The pipe section 6″ has mounted therein, above the hydraulic coupling 25, 27, etc., a plurality of members (not shown) in the form of inwardly and downwardly-inclined vanes or fins, for centering the pipe 3″ above the fitting 9, as the assembly 2, 3″, 28 is lowered into the brine pipe 6. In this way, the pipe 3″ is made to go through the fitting 9, as the assembly 2, 3″, 28 is lowered into the brine pipe by means of cable 18. The pipe 3″ continues down until the end plug 28 engages the hydraulic coupling and forms the hydraulic seal by means of the O-rings 14 and 15. As the plug fitting passes through the female fitting 9, it depresses the valve 25, moving the latter to its open position. Thus, by means of the passages 27 (now open), 29, and 30, the upper end of the bore of pipe 3″ is hydraulically connected to the outside of the brine pipe 6. The hydrocarbon stored in the cavern 1 will then flow through the aforementioned passages into pipe 3″, until the hydrocarbon-brine interface in pipe 3″ is at the same level as it is in the cavern 1.

Cable 18, electrically connected to resistance wire 2, serves as one connection to the resistance measuring bridge 4, the brine pipe 6 providing the other connection to the bridge. The metallic plug 28, engaging the top of the spider arms 7, 8, etc., is electrically connected thereto, and thus also to brine pipe 6. The pipe 3″ may be made either of metal (electrically conducting) or plastic (insulating). If a metal pipe is used, it becomes the second conductor (the first being of course the wire 2), and this pipe is electrically connected to plug 28 and thus to brine pipe 6. This second conductor serves as the ground connection. If a plastic pipe is used at 3″, a second heavy wire must be used to provide the ground connection; this second wire inside the insulating pipe 3″ would be electrically connected to plug 28 and thus to brine pipe 6. When the assembly 2, 3″, 28 is in place, the interface level inside pipe 3″ will be the same as in the cavern, and by means of resistance measurements made with the bridge, the cavern may be gauged, and the volume of product (hydrocarbon) therein ascertained.

Using the vertical resistance wire as so far described, there are two reference points which can be used to check the liquid level measuring apparatus (interface detector). First, when the cavern is full of product, the resistance will have a maximum value. Second, when the cavern contains only brine, the resistance will have a minimum value. Also, one or more additional check points may be included, in the form of fixed resistors, in the resistance wire line. For example, in the arrangement of FIGURES 2–3, wherein the resistance wire is attached to the outside of the brine pipe, a jumper at a pipe joint could be replaced by a fixed resistor. Then, as the interface passed this point there would be an abrupt change in the measured resistance value.

Of the two arrangements so far described, that of FIGURES 4–5 is easier to install, and it can be removed for repairs. However, since pipe 3″ and wire 2 occupy space inside the brine pipe, a greater impedance to the flow of brine through this pipe is presented.

The description of the apparatus of the invention, so far, has been based on the measurement of resistance at the surface, the volume of product in the cavern being ascertained from the measured value of resistance. In general, however, the interface detector of the invention may be considered as having impedance composed of resistance, capacitance, and inductance, and any one of these, or any combination thereof, could be measured to determine the length of unshorted conductor or wire. In some cases, the measurement of capacitance would be as simple as the measurement of resistance. If the bare resistance wire 2 were replaced with an insulated wire, its capacitance (relative to the surrounding grounded pipe) would be determined in part by the length thereof exposed to the conducting salt water or brine. If the cavern were full of brine or salt water, the capacitance would be $C_0$, a maximum, since the brine, being a good conductor, in effect moves the pipe 3″ (the second condenser plate) over to the insulation on wire 2; the interplate spacing is thus decreased, increasing the capacitance. Now, if the product (hydrocarbon, dielectric constant in the vicinity of 2) were introduced to lower the hydrocarbon-brine interface a distance $d$, the new capacitance C would be reduced to:

$$C = C_0 - K_0 d$$

where $K_c$ is the change in capacitance per unit distance. Thus, since $K_c$ and $C_o$ are known or can be determined, the distance $d$ can be determined by measuring the value $C$. From the distance $d$, of course, the volume of hydrocarbon can be determined, as previously explained. When hydrocarbon enters the pipe 3″, the second condenser plate is the pipe 3″, in effect. The properties of the brine which may still be within the pipe 3″ do not normally enter into the capacitance measurement.

It can be shown, mathematically, that the differential pressure (measured substantially at the top of the cavern, in the respective liquids) between the outside of the brine pipe (in the hydrocarbon) and the inside of the brine pipe (in the brine) is proportional to the distance $d$ in FIGURE 1, which is the distance from the top of the cavern to the interface. Thus, by measuring the pressure differential existing between these two liquids (both liquids being sensed or sampled at substantially the same horizontal level), the interface level in the cavern may be determined. As previously described, the volume of hydrocarbon in the cavern can be ascertained, once the interface level is known.

A generally preferred arrangement according to this invention, using a differential pressure measurement to determine the interface level in a salt storage cavern, will now be described, in connection with FIGURE 6. FIGURE 6 is a detailed, partial view somewhat similar to FIGURE 5, but illustrating a different type of measuring detector.

FIGURE 6 shows a special section 6″ of brine pipe generally similar to that in FIGURE 5, which section is installed at the time the brine pipe is put in the cavern well; the torpedo 16′, which is subsequently lowered down the brine pipe by means of a cable, is illustrated in its seated position in the special section 6″. As in FIGURE 5, the pipe section 6″ has a spider construction supporting the centrally-positioned female fitting 9. Just as in FIGURE 5, a spring loaded valve 25 is biased to normally close the transverse or radial channel 27 leading from the exterior of the brine pipe to the interior thereof; the inner end of this valve extends into fitting 9 and is adapted to be engaged by a portion of the torpedo 16′ (thereby opening the valve and placing a sealed-off chamber in the brine pipe in communication with the exterior of the brine pipe) when such torpedo is seated, as illustrated in FIGURE 6. Just as in FIGURE 5, the radial channel 27 is isolated from the main portion of the brine pipe interior. Also, the spider construction offers only a small amount of impedance to the flow of brine through the brine pipe, to and from the salt storage cavern.

The torpedo 16′ is adapted to mate with the female fitting 9, and carries upper and lower O-rings 14 and 15, respectively, each maintained in a suitable groove in the torpedo body. In the case of FIGURE 6, the sealed-off chamber 29 (which is provided between the O-rings 14 and 15 when the torpedo is seated, in which chamber is located the valve 25, and which chamber is adapted to be filled with hydrocarbon when valve 25 is open) may be formed by a reduced-diameter portion of the torpedo 16′, rather than by an increased-diameter portion of the female fitting 9, as in FIGURE 5. Torpedo 16′, as it is lowered into fitting 9, displaces the brine from chamber 29.

It may be desirable, in some cases, to attach a weight to torpedo 16′, to ensure proper seating of the main portion thereof in fitting 9. Such a weight may be conveniently provided by a metallic rod of such a diameter as to pass freely through fitting 9, this rod extending downwardly below the main body of the torpedo 16′ and being secured thereto by means of a tapped aperture 33 provided in the torpedo.

The torpedo 16′ has mounted thereon a differential pressure transducer (indicated generally by numeral 34) which operates to measure the static pressure difference between two fluids (liquids) and to convert this pressure to a corresponding value of resistance; this resistance value is transmitted to the surface by means of a cable and measured by a resistance measuring bridge such as bridge 4 of FIGURE 1. Essentially, this is done by conveying the two liquids to opposite sides of a diaphragm 35, or other means which produces mechanical movements in response to pressure variations, and utilizing the diaphragm movements to vary the position of a movable contact on a potentiometric type variable resistance 36. Electrical connections are made, by means of cable 18, to the movable contact on this resistance. Such cable is mechanically connected to torpedo 16′, to permit raising and lowering of the torpedo from the surface, as desired, and is electrically connected at the surface to a resistnace measuring bridge such as bridge 4, by means of which the resistance between the movable contact on the resistance 36 and a selected end thereof (viz, ground) may be measured. The measured resistance represents, and is proportional to, the differential pressure between the two liquids applied to opposite sides of the diaphragm 35.

One of the two liquids referred to, in connection with differential pressure transducer 34, is the hydrocarbon (product) which is in the well casing 5, on the exterior of the brine pipe 6. When valve 25 is moved to its open position by the presence of the body of torpedo 16′ in fitting 9, hydrocarbon flows through passage 27 into chamber 29. The torpedo 16′ is provided with a continuous interior passage 37 communicating at one end with chamber 29 and at its other end with the lower side of diaphragm 35. When torpedo 16′ is seated and valve 25 open, a continuous open passage is provided from the outside of the brine pipe to the lower side of diaphragm 35, so that the liquid hydrocarbon pressure at or adjacent the level of passage 27 is effective on the lower side of the diaphragm. In this connection, it will be recalled that when torpedo 16′ is seated in fitting 9, the O-rings 14 and 15 sealingly engage the wall of fitting 9 to provide the chamber 29 which is sealed off from brine pipe 6.

The other of the two liquids referred to in connection with differential pressure transducer 34, is the brine which is in the interior of brine pipe 6. The torpedo 16′ is provided with at least one (though there may be more than one) interior passage 38 communicating at one end with the interior of brine pipe 6, outside of chamber 29, and at its other end with the upper side of diaphragm 35. Thus, when torpedo 16′ is seated, a continuous open passage is provided from the interior of the brine pipe to the upper side of diaphragm 35, so that the liquid brine pressure at or adjacent the level of passage 38 is effective on the upper side of the diaphragm.

If there is any hydrocarbon in the cavern, so that the distance $d$ (FIGURE 1) is greater than zero, the liquid pressure on the outside of the brine pipe will be greater than that on the inside of the brine pipe. The difference between these two liquid pressures, as previously described, will be proportional to the distance $d$ from the top of the cavern to the hydrocarbon-brine interface. The amount of this differential pressure is sensed by transducer 34 and is changed thereby to a resistance whose value is proportional to this amount. The value of this resistance is measured at the surface by means of the resistance measuring bridge, and the value measured provides a measurement of the liquid level (interface level) in the salt storage cavern.

By means of a "strapping curve" previously obtained by measuring the resistance (the value of which is transmitted to the surface by means of transducer 34, and which represents a corresponding differential pressure value) for each step of known volume, the volume of product in the cavern may be ascertained for the particular resistance value measured at the time.

The pipe section 6″ of FIGURE 6, like that of FIG-

URE 5, preferably has mounted therein, above the hydraulic coupling 25, 27, etc., a plurality of members (not shown) in the form of inwardly and downwardly-inclined vanes or fins, for centering the torpedo 16' above the fitting 9, as the torpedo 16' is lowered into the brine pipe. In this way, the torpedo is made to enter into the fitting 9, as the former is lowered into the brine pipe by means of the supporting and electrically connecting cable 18. The torpedo 16' continues down until a portion thereof engages the hydraulic coupling and forms the hydraulic seal by means of the O-rings 14 and 15. At this time, the body of the torpedo has engaged the inwardly-extending stem of valve 25, thereby opening this valve.

The invention claimed is:

1. In a subterranean salt storage cavern for storing a layer of liquid above a layer of brine, a brine pipe extending from the surface substantially to the bottom of said cavern, means defining a space surrounding said pipe through which the liquid to be stored may be pumped, said pipe having therein, at a location adjacent the top of said cavern, a channel connecting the interior of said pipe to said space; actuatable means positioned in said channel and normally closing the same, and a member adapted to be lowered from the surface through said pipe, said member actuating said last-named means to the channel-opening position when said member reaches said location, said member cooperating with said pipe to form a chamber therebetween, into which said channel then opens.

2. The combination set forth in claim 1, including also a differential pressure transducer mounted on said member and acting to measure the pressure differential between said space and the interior of said pipe, when said channel is open.

3. The combination set forth in claim 1, wherein said actuatable means comprises a valve interposed in said channel and adapted to be actuated by said member to its open position; said combination including also a differential pressure transducer mounted on said member and acting to measure the pressure differential between said space and the interior of said pipe, when said channel is open.

4. The combination set forth in claim 1, wherein said actuatable means comprises a valve interposed in said channel and adapted to be actuated by said member to its open position.

5. The combination set forth in claim 1, wherein said chamber is defined by seals which engage said member and said pipe at locations respectively above and below said channel.

6. The combination set forth in claim 1, wherein said actuatable means comprises a valve interposed in said channel and adapted to be actuated by said member to its open position, and wherein said chamber is defined by seals which engage said member and said pipe at locations respectively above and below said channel.

7. The combination set forth in claim 1, wherein said actuatable means comprises a valve interposed in said channel and adapted to be actuated by said member to its open position, and wherein said chamber is defined by seals which engage said member and said pipe at locations respectively above and below said channel; said combination including further a differential pressure transducer mounted on said member and acting to measure the pressure differential between said space and the interior of said pipe, when said channel is open.

8. In a subterranean salt storage cavern for storing a layer of liquid above a layer of brine, an outer storage liquid pipe extending from the surface to the top of said cavern, an inner brine pipe extending from the surface substantially to the bottom of said cavern, said inner pipe having therein, at a location adjacent the top of said cavern, a channel connecting the interior of said inner pipe to the space surrounding the same; actuatable means positioned in said channel and normally closing the same, and a member adapted to be lowered from the surface through said inner pipe, said member actuating said means to the channel-opening position when said member reaches said location, said member cooperating with said inner pipe to form a chamber therebetween, into which said channel then opens.

9. The combination set forth in claim 8, including also a differential pressure transducer mounted on said member and acting to measure the pressure differential between said surrounding space and the interior of said inner pipe, when said channel is open.

10. The combination set forth in claim 8, wherein said actuatable means comprises a valve interposed in said channel and adapted to be actuated by said member to its open position.

11. The combination set forth in claim 8, wherein said chamber is defined by seals which engage said member and said inner pipe at locations respectively above and below said channel.

12. The combination set forth in claim 8, wherein said actuatable means comprises a valve interposed in said channel and adapted to be actuated by said member to its open position, and wherein said chamber is defined by seals which engage said member and said inner pipe at locations respectively above and below said channel; said combination including further a differential pressure transducer mounted on said member and acting to measure the difference in pressure between said surrounding space and the interior of said inner pipe, when said channel is open.

References Cited in the file of this patent

UNITED STATES PATENTS

| | | |
|---|---|---|
| 2,701,960 | Irwin | Feb. 15, 1955 |
| 2,718,145 | Nisle | Sept. 20, 1955 |
| 2,843,823 | Bayless | July 15, 1958 |
| 2,938,383 | Blackburn | May 31, 1960 |